(12) United States Patent
Baker

(10) Patent No.: US 6,462,447 B1
(45) Date of Patent: Oct. 8, 2002

(54) MOTION TRANSMISSION DEVICES

(76) Inventor: Joseph Peter William Baker, 18 Huntsman's Meadow, Ascot Berkshire SL5 7PF (GB)

(*) Notice: Subject to any disclaimer, the term of this patent is extended or adjusted under 35 U.S.C. 154(b) by 0 days.

(21) Appl. No.: 09/701,679

(22) PCT Filed: May 25, 1999

(86) PCT No.: PCT/GB99/01639

§ 371 (c)(1),
(2), (4) Date: Nov. 29, 2000

(87) PCT Pub. No.: WO99/63648

PCT Pub. Date: Dec. 9, 1999

(30) Foreign Application Priority Data

May 29, 1998 (GB) .............................................. 9811675
Dec. 10, 1998 (GB) .............................................. 9827241

(51) Int. Cl.[7] .............................................. F16H 13/12
(52) U.S. Cl. ..................... 310/103; 74/DIG. 4; 310/96; 310/114
(58) Field of Search ............................... 310/75 R, 103, 310/92, 96, 105, 106, 107, 108, 109, 110, 114; 74/DIG. 4

(56) References Cited

U.S. PATENT DOCUMENTS

| 3,777,587 A | * 12/1973 | Hoshina et al. ............... 310/80 |
| 3,824,420 A | * 7/1974 | Stegeman et al. ............. 310/89 |
| 4,354,125 A | * 10/1982 | Stoll .......................... 310/103 |
| 4,858,383 A | 8/1989 | Kendig ........................ 49/360 |
| 5,476,338 A | 12/1995 | Alberts .......................... 404/6 |
| 5,524,499 A | * 6/1996 | Joffe ........................ 74/89.15 |
| 5,569,111 A | * 10/1996 | Cho et al. .................... 475/149 |
| 5,687,614 A | * 11/1997 | Hashimoto et al. ........... 74/459 |
| 6,111,491 A | * 8/2000 | Furuse et al. ............... 335/285 |

FOREIGN PATENT DOCUMENTS

| DE | 1603652 | * 4/1971 | |
| DE | 2240569 | * 1/1974 | ........... F16H/15/02 |
| DE | 2459408 | * 6/1976 | ........... F16H/25/06 |
| EP | 000476357 A1 | * 3/1992 | ........... H02K/49/10 |
| JP | 5231487 | * 9/1993 | ........... F16H/13/12 |
| JP | 5340455 | * 12/1993 | ........... F16H/13/12 |

* cited by examiner

Primary Examiner—Burton S. Mullins
(74) Attorney, Agent, or Firm—Thomas M. Freiburger

(57) ABSTRACT

A magnetic motion transmission device (10) which comprises a magnetic body (15) which has an outer cylindrical surface and radial end walls, is polarized axially of the cylindrical surface and, at the opposed radial ends of the cylindrical surface, has a pair of disc-like pole plates (14, 16) that are of a like diameter greater than the diameter of the cylindrical surface. The pole plates (14, 16) are mounted axially at the opposed radial ends of the magnetic body by an axle pin (18) of non-magnetic material (e.g. brass). The device (10) serves in use to effect motion transmission between first and second members (11, 12), the second surface being either planar or cylindrical or frusto-conical. Examples described of applications of the magnetic motion transmission device (10) include an arrangement in which the second member (12) is cylindrical and provides a rotary output drive—derived magnetically from the first member (11)—to an angularly rotable output shaft of a pivoting gate or like closure member for an opening, and an arrangement in which the second member is an upstanding planar surface internally of a hollow bollard located adjacent one edge of a throughway, and a barrier element extends from a said first member within the hollow bollard to another said first member within a similar bollard located adjacent an opposite edge of the throughway.

13 Claims, 5 Drawing Sheets

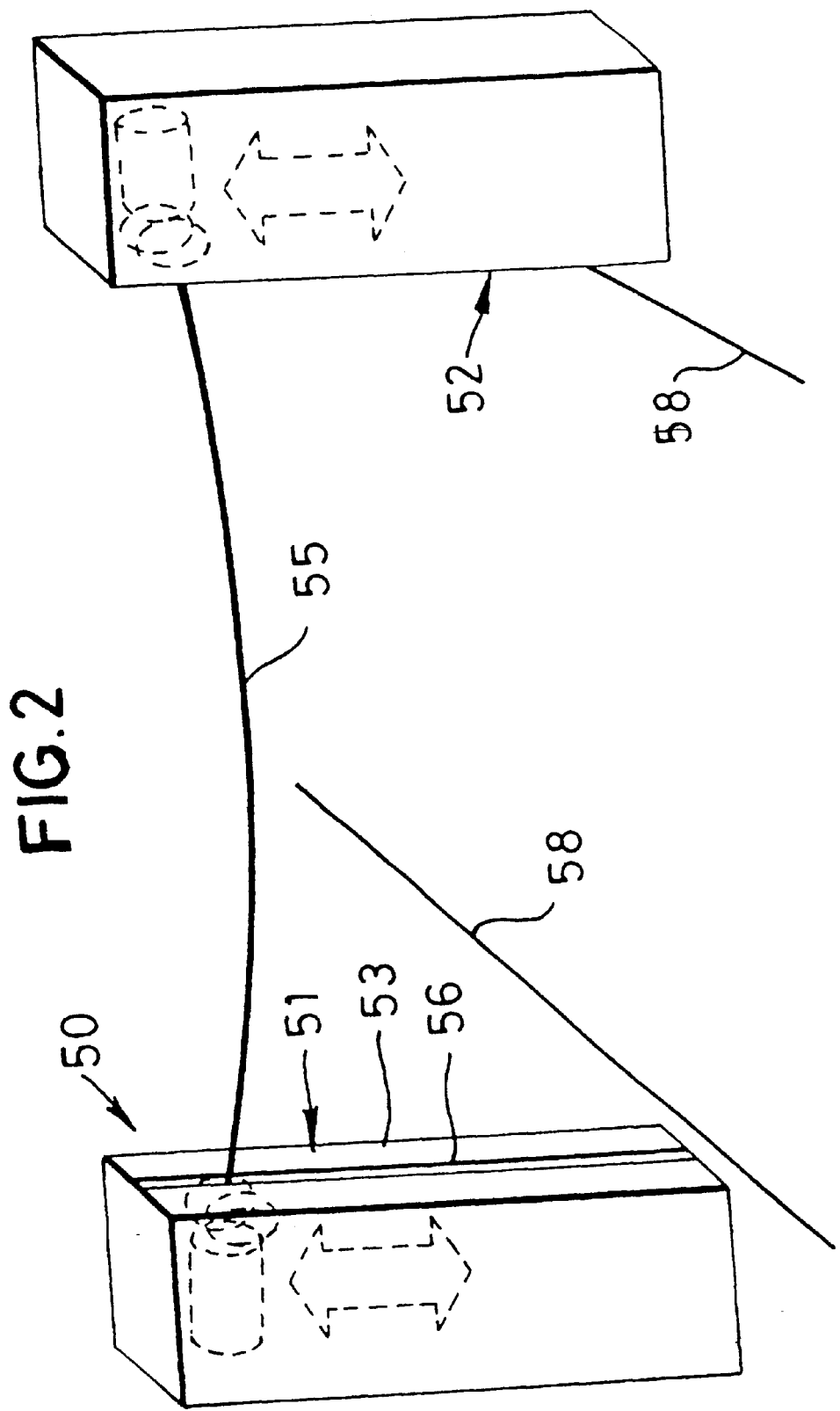

_US 6,462,447 B1_

MOTION TRANSMISSION DEVICES

DESCRIPTION

1. Technical Field

This invention relates to motion transmission devices and in particular to such devices to transmit motion from a first member to a second member via a magnetic coupling effect between them.

2. Background Art

Though not limited thereto the present invention is considered particularly useful for directly linking a rotating output shaft to a device which converts the rotational motion into linear or reciprocal motion. The most common known way of achieving this is to provide the rotatable shaft as or with a lead screw and have a follower unit travel longitudinally of the shaft along the threads of the lead screw.

In WO95/108860 the electrically induced rotation of an internally threaded, outer cylinder is transmitted to an internal, linearly driven shaft by means of rollers provided with rings which define camming surfaces engaged by the internally threaded bore of the cylinder and which engage annular rings to one end of the internal shaft. The drive transmission effected by the rollers is wholly mechanical in nature and the publication suggests that, to avoid slippage, the discs be provided with gear teeth—a costly item. A similar arrangement, using a ball nut engaging a ball screw portion of a spindle, is disclosed in GB-2248976.

In WO96/19035 two mutually spaced rotary discs or cylinders have a rotary drive transmitted magnetically across the space between them. In one suggested embodiment the rotary discs are provided with a plurality of spaced magnets of disc-like form with opposite faces being North and South poles respectively. However, the angularly spaced nature of these magnets produces a step-wise motion transmission rather than a smooth motion transfer of substantially constant velocity.

GB-1333641 employs an electromagnet selectively to couple and de-couple magnetically a threaded nut and a threaded worm, the magnetic effect being across the gap between crests and troughs of the opposed threads. Like spacing between magnetised helical screw threads that are confrontingly arranged but are kept spaced apart are detailed in the linear-to-rotary converter (a so-called "harmonic drive") disclosed in GB-2088017. Another such "harmonic drive" is disclosed in GB-2205452.

In EP-0583035, mutually spaced internal and external coupling members are each provided with a double helical thread and a magnetising member for generating a magnetic flux (in the form of a helical magnetic field) which permeates both coupling members, and follows a helical path between the double thread such that the individual threads form a pole shoe for the magnetising member. The magnetising member is provided by a series of axially polarised permanent magnets wholly embedded into the periphery of one of the coupling members. This arrangement is very expensive to produce commercially.

The present invention is concerned to overcome the complexity and manufacturing expense of motion transmission devices of the prior art.

SUMMARY OF THE INVENTION

According to one aspect of this invention there is provided a magnetic motion transmission device which comprises a magnetic body which has an outer cylindrical surface and radial end walls, is polarised axially of the cylindrical surface and, at the opposed radial ends of the cylindrical surface, has a pair of disc-like pole plates that are of a like diameter greater than the diameter of the cylindrical surface, According to another aspect of this invention, to effect motion transmission between first and second members, there is provided apparatus including said members and means to provide a magnetic coupling effect between them, characterised in that said first member comprises a device according to said first aspect of this invention, and in that the second member has a surface engaged by said disc-like pole plates and is of magnetically permeable material at or at least adjacent to the engaged surface to contact said surface.

By effecting contact engagement between the first members pole pieces and said surface, the effect is created of a low reluctance path for the magnetic flux (in the manner of a keeper or of a pole shoe) between the disc-like pole plates.

Preferably the pole plates are mounted axially at the opposed radial ends of the magnetic body by an axle pin of non-magnetic material (e.g. brass). Optionally, for certain applications, the magnetic body may be provided with an axial bore providing a loose fit for the axle pin to permit the body to slew to a limited degree. If the said second member has a cylindrical or conical form, this loose-fitting axle pin permits the body to adopt a skewed position with respect to the axis of the cylinder or cone.

Advantageously, the said second member has a generally cylindrical or conical surface (with or without a helical formation therearound) and is rotatable about the axis of said surface. Advantageously the said first member is constrained to move longitudinally of that axis as it rotates about the said cylindrical or conical surface.

Preferably, a plurality (e.g. at least three) of said first members is provided, these members being mounted equiangularly about the axis of said cylindrical or conical surface by cage means that allow them to rotate individually about their own axes.

Advantageously, where the surface of said second member is cylindrical, the plurality of first members may be encompassed by an outer ring member having an inner surface in engagement with the disc-like pole pieces and, at least adjacent to the engagement surface, comprising a magnetically permeable material to provide the effect of a low reluctance path for the magnetic flux (in the manner of a pole shoe) between the disc-like pole plates.

Preferably the said second member has a generally cylindrical surface and the latter is provided with a helical formation, e.g. a screw thread or spiral spring provided thereon, that is engaged by the disc-like pole pieces. In use, as the second member is rotated about the axis of its generally cylindrical surface (and helical formation), the pole pieces constrain the or each said first member to move generally axially thereof around its own individual axis and—by virtue of the magnetic coupling between said members—as a whole with respect to the surface of said second member.

Where the device incorporates the preferred features of the last two paragraphs, and the outer ring member is constrained against rotatary motion, the outer ring member will be moved axially by the axially moving first member(s) but such motion will be at a reduced rate since the (or each) first member rotates in an idling mode—whilst maintaining contact of its pole pieces with both the outer ring and the said second member. This measure of idling is primarily related to the diameter of the inner surface of the outer ring member, the diameter of the disc-like pole pieces, the diameter of the generally cylindrical surface of the second member and the ratios of one to the other.

BRIEF DESCRIPTION OF THE DRAWINGS

By way of example, embodiments of this invention will now be described with reference to the accompanying drawings of which:

FIG. 2 is a schematic perspective view of apparatus according to the invention and incorporating a relative rotary-to-linear motion transmission as that of FIG. 1.

DETAILED DESCRIPTION OF EXAMPLE(S) OF THE INVENTION

Figure 1:
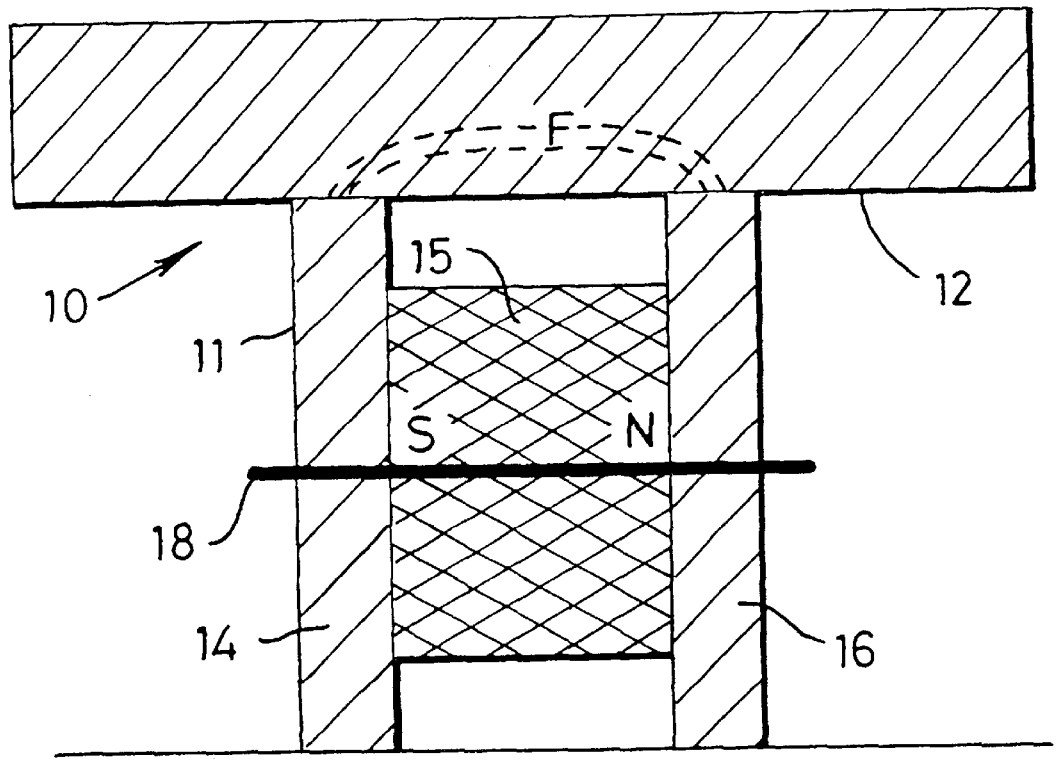
FIG. 1 is a schematic cross-sectional view of apparatus according to a first embodiment of this invention and for effecting a relative rotary-to-linear motion transmission.

The embodiment illustrated schematically in FIG. 1 is to convert and transfer the rotary motion of a first member 11 into the relative linear motion of a second member 12 via a magnetic coupling effect (to hold contact engagement between them) and the friction between the surfaces in engaged contact with one another. The first member 11 comprises an annular body 15 of magnetic material that is polarised axially with a North (seeking) pole N at one radial end and a South (seeking) pole S at the opposite radial end. The body 15 has an axial bore therethrough and a- pair of disc-like steel washers 14,16 are mounted on and retained by the ends of an axle pin 18 extending through the bore. The axle pin 18 is of brass or other suitable non-magnetic material. Optionally the bore diameter is marginally greater than the diameter of the axle pin 18 to permit the body to slew to a limited degree.

The two washers 14,16 are identically dimensioned and are each of greater diameter than the outer diameter of the annular body 15 and thus form annular pole plates for the magnetic body 15. The difference in diameter can be proportionately smaller than that illustrated, e.g. of the order of 1 to 5 mm, and the washers 14,16 can be of any desired thickness sufficient to redirect the flux from each end of the magnetic body 15 towards the periphery of the adjacent washer.

In a particularly preferred construction, the annular body 15 comprises a magnetised ring of ferrite of about 67 mm diameter and 15 mm thickness, sandwiched between two mild steel discs or washers 14,16 of approximately 70 mm outer diameter and 6 mm thickness forming the pole pieces, and arranged to provide a shear force between the periphery of discs 14, 16 and the surface of member 12 equivalent to approximately 1.5 Nm. The loose interconnection of parts 14, 15 and 16 allows for their dynamic alignment, and their close contact being mechanically 'encouraged' whereby their contact engagement with the surface of member 12—via the magnetic coupling between pole pieces 14, 16 and the surface of member 12 (e.g. a steel track) maintains traction but permits controlled slippage in the event of a predetermined overload condition.

In one application of this embodiment, member 12 has a lowermost horizontal planar surface (e.g. is of generally horizontal plate-like form) and is wholly, or at least adjacent to its lower surface, of a magnetically permeable material. This lower surface is engaged by a plurality of the motion transmission device 11 which serve as roller assemblies to support the second member 12. When the roller-like bodies 15 are rotated in a common direction about their respective axes, they will effect a linear translation of member 12 by creating a low reluctance path F for the magnetic flux between the pole plates 14,16. The plate-like member 12 thus acts much in the manner of a keeper or pole shoe for the poles of member 11.

Figure 3:
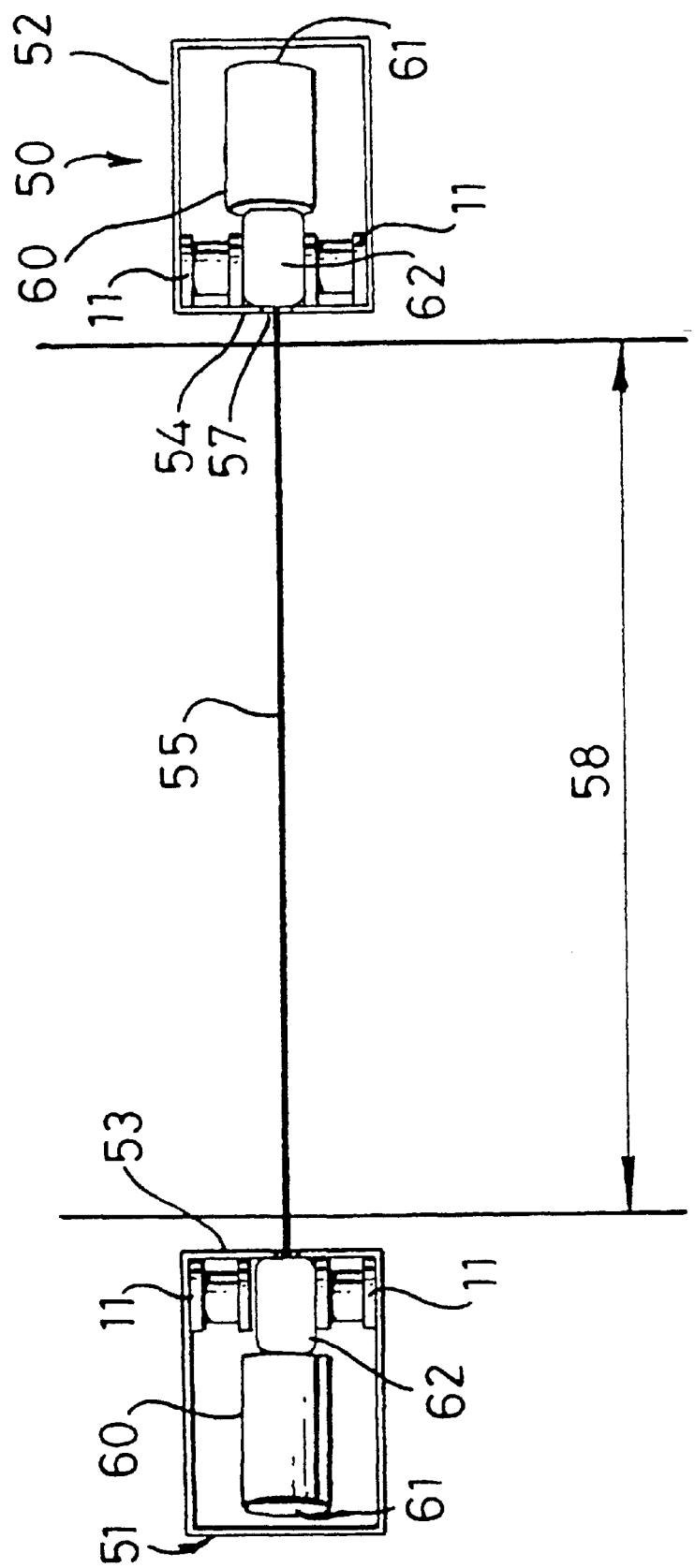
FIG. 3 is a horizontal cross-sectional view of the apparatus shown in FIG. 2.

Another application of this embodiment, in which member 12 provides a planar surface, is the barrier system 50 shown in FIGS. 2 and 3. This barrier system 50 comprises a pair of hollow steel bollards 51,52 of generally rectangular horizontal cross-section disposed one to each side of a roadway (or other throughway) 58, the mutually facing upright walls 53,54 of the bollards being of vertical planar form and each having a vertical slot 56,57 therein. The slots 56 divide each wall 53,54 into a pair of vertical engagement surfaces 12 internally of the hollow bollards. A barrier element 55, e.g. a steel link chain, steel cable or the like, extends through the slots 56,57 and across the roadway. Each of the two ends of the element 55 are attached to the casing of an associated movable drive device 60 located within a respective one of the .hollow bollards 51, 52.

Each movable drive device 60 comprises a pair of motion transmission devices 11 and is supported for movement upwardly and downwardly within an associated bollard 51,52 by a cable passing over a fixed upper pulley to a counterweight matching the weight of the device 60 plus approximately half the weight of the barrier element 55.

Each device 60 comprises a motor 61 coupled via a bevel-gear or worm drive gearbox 62 to a pair of rotary motion translation devices 11 that are mounted on a common output drive shaft of gearbox 62 extending perpendicular to the output shaft of motor 61. Each of the two rotary motion translation devices 11 accords with that described above with regard to FIG. 1.

Each of the two rotary motion translation devices 65 is thus magnetically coupled, rollingly, to the magnetically permeable steel interior surface 12 of wall 53 or 54 of its associated bollard 51,52 and this magnetic coupling is assisted by the resultant laterally-directed force due to the weight of the barrier element. When the roller-like bodies 15 are rotated in a common direction about their respective axes by the output shaft of the gearbox 62 (upon the opposite ends of which they are mounted) they effect a linear translation of the combined motor 61, gearbox 62 and device 65 with respect to the respective wall 53 or 54 by creating a low reluctance path F for the magnetic flux between the pole plates 14,16. The positionally fixed wall 53 or 54 thus acts much in the manner of a keeper or pole shoe for the poles of each magnetic coupling device 60.

It will thus be appreciated that as the two motors 61 are operated in one sense, the four devices 11 rotate in a first sense (clockwise in bollard 51 and counterclockwise in bollard 52, as viewed in FIG. 2) to travel upwardly from a lowered position and raise with them the counterweighted motors 61 and the opposite ends of the cable 55 attached to them. Likewise, as the two motors 61 are operated in the opposite sense, the four devices 11 rotate in the opposite (second) sense (counterclockwise in bollard 51 and clockwise in bollard 52, when viewd as in FIG. 2) to lower the motors 61 and the opposite ends of the cable 55—which does not relax its tension or increase in length.

It will be further appreciated that, since each drive device 11 is free to slip with respect to its associated interior surface 12 of wall 53 or 54, little or no damage will arise if a car should ride over the half lowered cable 55. Optionally each motor assembly may be held in its raised upper position by an electromagnet. In addition, because each drive assembly 60 is retained in place by virtue of magnetic attraction (and the tension in cable 55 due to its own weight) each unit 60 may be easily removed for servicing or repair.

In a modification of the above-described construction, a single roller device 11 may be provided in each housing 51,52 (instead of a pair). In another modification, particularly appropriate with a single roller device 11, the ends of the cable 55 are formed into a loop or joined to a collar and that loop or collar encompasses the roller body 15 of the device 11.

With either said modification, the rolling washers or discs 14,16 may be frusto-conical or part-spherical to provide shaped peripheries that are angled or curved (instead of cylindrical), these shaped peripheries engaging upstanding walls 53,54 of corresponding non-planar shape. In another modification, the walls 53,54 may be slightly inclined towards or away from one another so that, although upstanding, they are not truly vertical. In such a case the exposed length of the barrier element 55, although remaining substantially constant, may vary slightly as between its upward, raised condition and its lowered condition.

In yet another modification, the barrier element 55 may be provided as a top wire hawser supporting pendant material, e.g. netting, high visibility artificial fabric, flexible chain mail (for instance formed as a tube through which the wire passes), reflective beads, or other pendant material.

In still another modification, the throughway (vehicle roadway or pedestrian pathway) may be provided with a channel to accommodate the barrier element 55 in its lowered condition.

Figure 4:
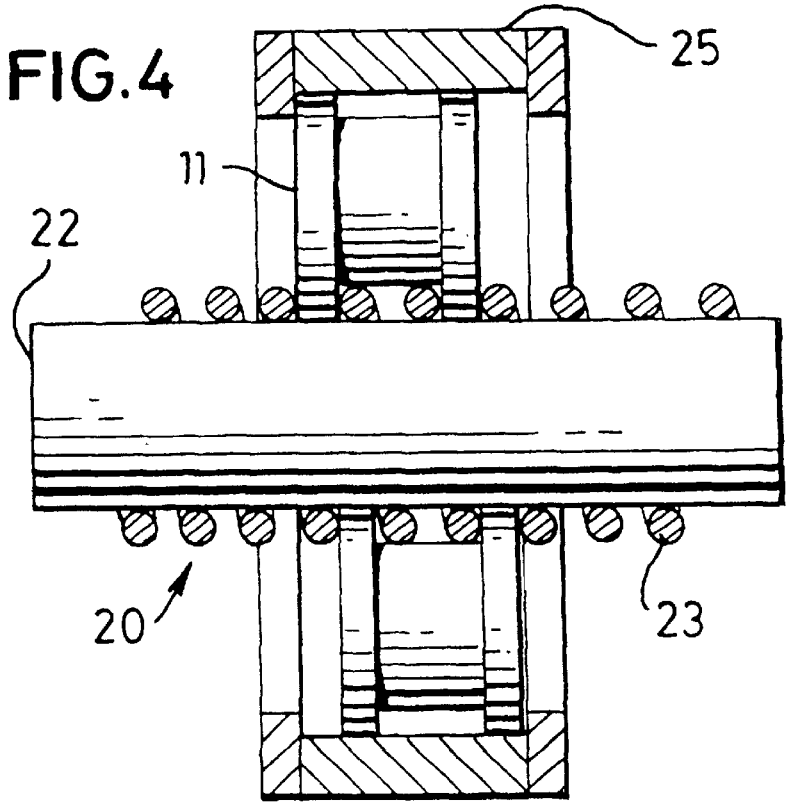
FIG. 4 is a schematic cross-sectional view of apparatus according to a second embodiment of this invention and for effecting a relative rotary-to-linear motion transmission.
Figure 5:
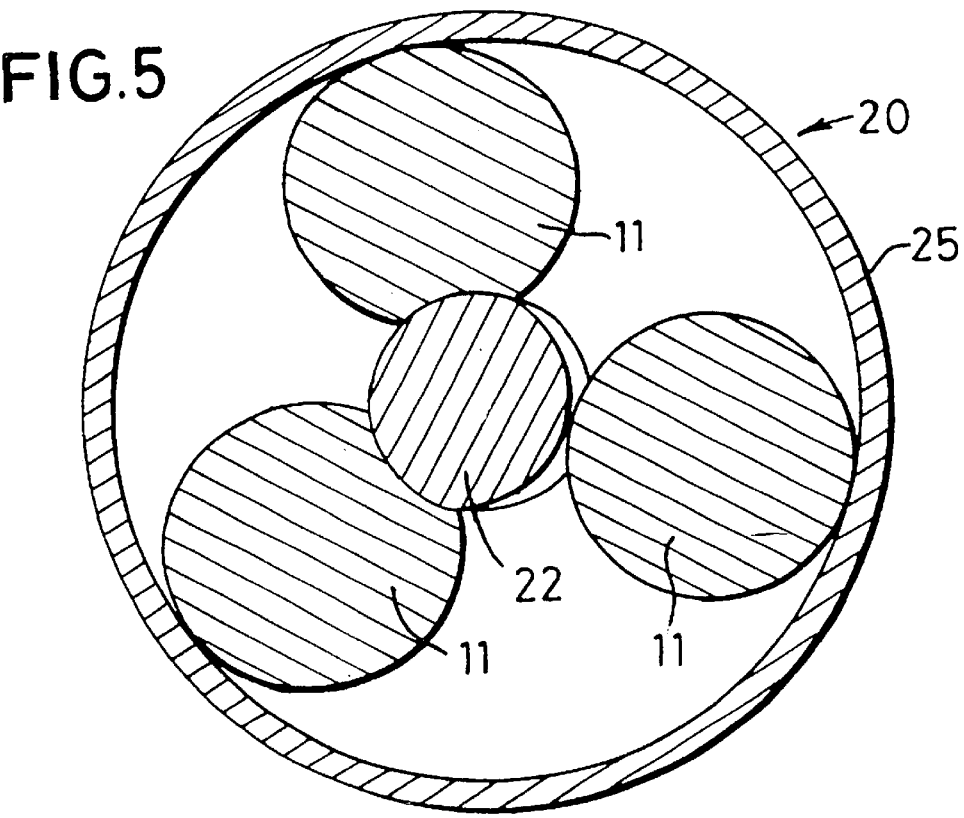
FIG. 5 is a schematic radial cross-section through the apparatus illustrated in FIG. 4.
Figure 6:
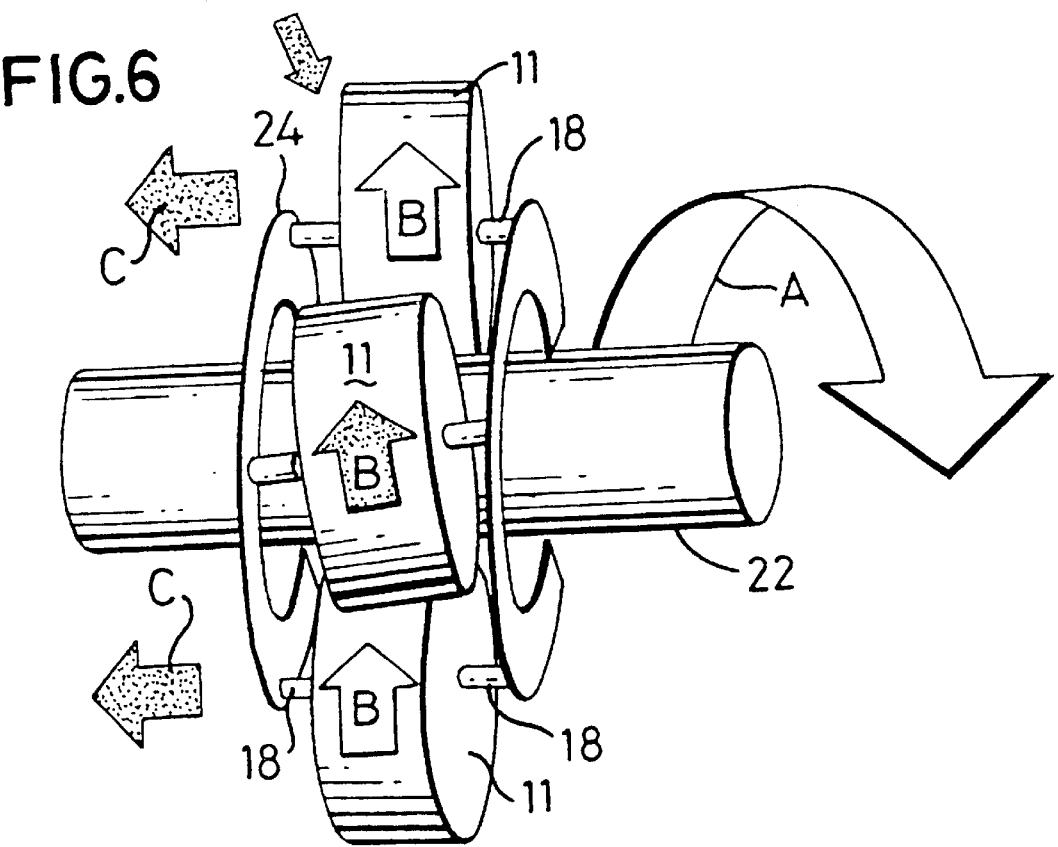
FIG. 6 is a diagrammatic perspective view of the apparatus of FIGS. 4 and 5 with an outer ring removed.

In the embodiment illustrated schematically in FIGS. 4 to 6, three roller assemblies 11 are provided equi-angularly about a shaft 22 that is provided with a helical formation 23. The helical formation 23 may be a conventional thread formed in the cylindrical surface of the shaft 22 or, as shown, may be formed by a spiral spring that is secured (by at least its ends) to the shaft's surface. The three roller assemblies 11 are each located with their axes slightly skew to the axis of shaft 22 and such that their respective pole plates 14,16 can engage in the 'troughs' between the turns of the helical formation 23. Nevertheless, due to the loose fit of each magnetic body 15 on its axle pin 18, the individual axle pins 18 can still extend generally parallel to the axis of shaft 22.

These axle pins 18 extend between a pair of annular discs 24 that provide a cage holding the roller assemblies 11 equi-angularly spaced from one another around the shaft 22. As the shaft 22 is rotated in the direction shown by the arrow A, the individual roller assemblies 11 rotate in the direction shown by the arrows B and, collectively, travel with the cage 24 in the direction shown by the arrow C.

It will be seen from FIG. 6 that whilst effecting this motion transmission from rotating shaft 22 to the roller assemblies 11, the axes of the roller assemblies 11 are kept in a somewhat skewed relation with respect to the axis of shaft 22.

As shown in FIGS. 4 and 5, the transmission device 20 includes an outer ring 25 that encompasses the three roller assemblies 11. The ring 25, or at least its region constituting or adjacent to its inner surface, is of steel or another magnetically permeable material and is engaged by the pole pieces 14,16 of all the assemblies 11. The outer ring 25 is held against rotation but is free to move axially. Thus, as the cage 24 (see FIG. 6) and roller assemblies 11 move collectively longitudinally of shaft 22 as the latter is rotated, so too is the outer ring 25 moved longitudinally.

It will be appreciated that the rotational movement imparted to the roller assemblies 11 by the magnetically-enhanced frictional contact between those assemblies and shaft 22 is resisted by the magnetic flux acting between the pole pieces of these roller assemblies 11 and the outer ring 25. This causes the roller assemblies 11 to rotate together in an idling mode around the shaft 22 (in the manner of planet wheels), whilst nevertheless magnetically maintaining contact between their pole pieces 14,16 and both the outer ring 25 and the shaft 22. The degree of idling created is dependent primarily on the respective diameters of inner surface of ring 25, the outer surface of shaft 22, the diameter of the pole pieces 14,15 and the ratios of one to the other. This predetermined degree of "idling"allows for a very high step-down transmission ratio between the input rotational speed on shaft 22 and the speed of linear motion of the outer ring 25.

It will thus be apparent that the points of contact engagement of the caged roller assemblies 11 and the shaft 22 can move in the opposite rotary direction around the axis of shaft 22 to that to be normally effected by a conventional helix; and the roller assemblies 11 thus move together in the style of planet wheels around the shaft 22 and change the gearing ratio. They thus behave as idlers and their size depends on the need for them to be in contact engagement with both the shaft 22 and the outer ring— it being primarily the ratio of the diameter of the shaft and the outer ring's inner surface that determines the gearing ratio.

In one modification, suggested by FIG. 6, the outer ring 25 may be omitted. This would provide a direct ratio relation between the linear motion of the caged roller assemblies 11 and the pitch of the helical formation 23 (omitted from FIG. 6).

In another modification, also suggested by FIG. 6, the helical formation 23 may be omitted and the end discs of cage 24 may be offset angularly from one another such that the axle pins 18 are skew to the axis of shaft 22. It is then the skew angle that, determines the direct ratio relation between the input rotation of shaft 22 and the linear output motion of the caged roller assemblies 11.

In yet another embodiment (not shown), the shaft 22 is replaced by a conical or frusto-conical structure with its outer surface engaged by one or more roller assemblies 11. The roller assemblies will thus engage the conical surface at varying spacings from the cone axis as these assemblies move longitudinally of the cone axis. Accordingly the transmission ratio between the conical surface and the roller assemblies will vary with the longitudinal position of those roller assemblies.

Figure 7:
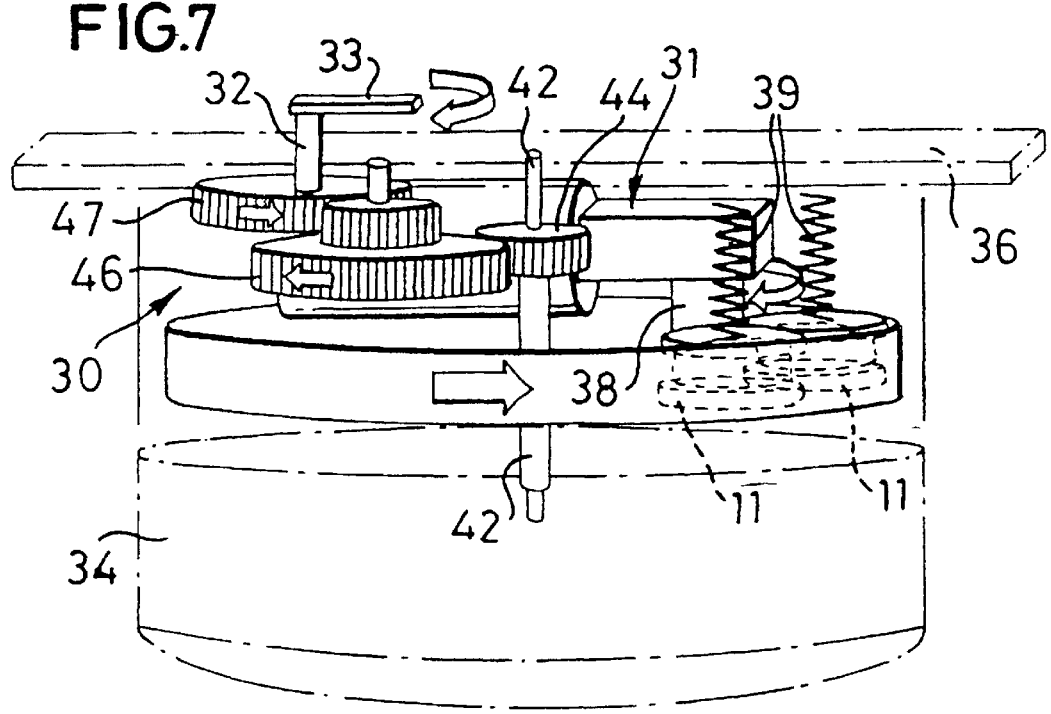
FIG. 7 is a partly exploded and broken away perspective view of a drive unit incorporating a third embodiment of this invention that effects a relative rotary-to-rotary motion transmission.
Figure 8:
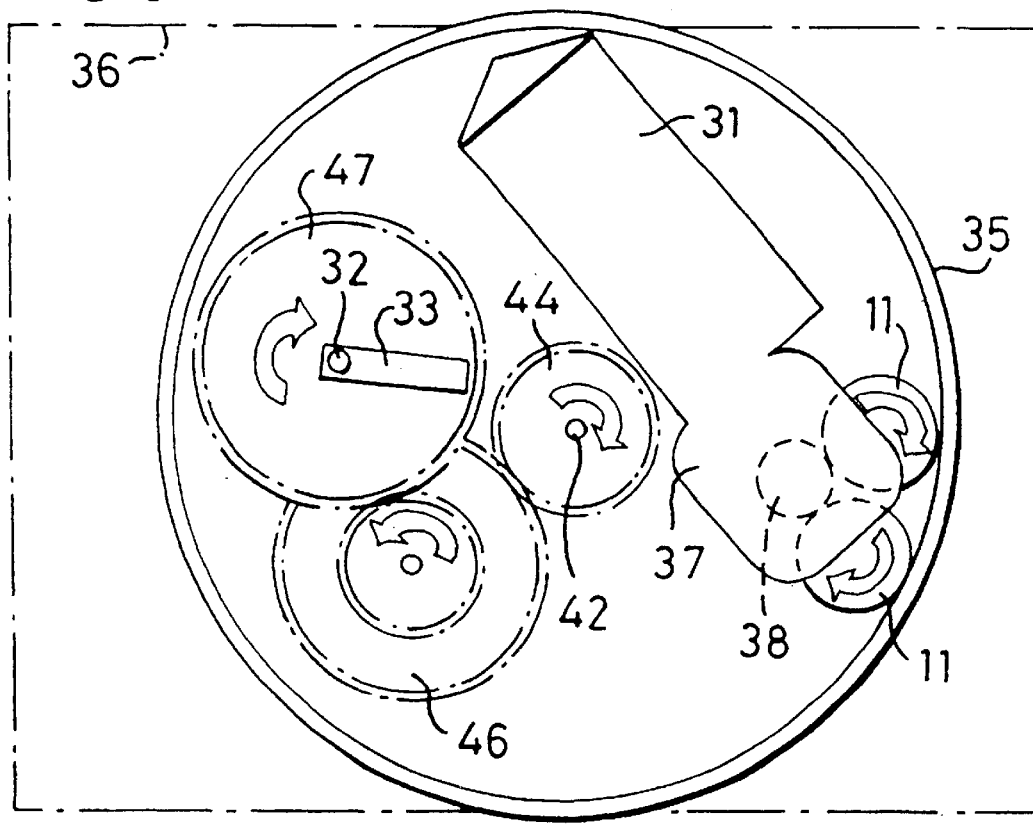
FIG. 8 is a schematic plan view of the apparatus of FIG. 7.

One example of an application in which a rotary motion is derived from the rotary motion of one or more transmission devices 11 is illustrated diagrammatically in FIGS. 7 and 8. In this application, a pair of roller assemblies 11 is incorporated in the drive transmission 30 from a drive motor 31 to an angularly rotatable output shaft 32. The output shaft 32 has attached thereto a radiating arm 33 that supports in use a pivoting gate or like closure member (not shown). As shown, the drive transmission 30 is housed within a cylindrical housing 34 having a top closure 36 below arm 33 and through which output shaft 32 extends. The drive motor 31 is coupled via a worm gear 37 to drive a vertically directed output shaft 38. The vertically directed output shaft 38 has its outer surface engaged by two roller assemblies 11. The latter are mounted floatingly by a suitable mechanism (illustrated solely for conceptual reasons by coiled springs 39) such as to effect rotary motion transfer from the shaft 32 to the inner cylindrical surface of a cup-shaped pressing 35 of mild steel (or other magnetically permeable material).

The floating arrangement is such that as shaft 32 rotates in one direction it frictionally draws one of the roller assemblies more into the therewith-associated decreasing gap between the shaft's outer cylindrical surface and the inner cylindrical surface of the cup-shaped pressing 35, whilst at the same time drawing the other roller assembly more out of the therewith-associated (opposite) decreasing gap between the shaft's outer cylindrical surface and the inner cylindrical surface of the cup-shaped pressing 35. Thus, with shaft rotation in the one direction, the said one roller assembly will "bite"more between the shaft and the cup than the other roller assembly which, under loading, will tend to slip. When the shaft 32 is rotated in the opposite direction, the opposite scenario occurs. It will therefore be apparent that the provision of the two roller assemblies 11 can provide for a reliable drive transfer in each of forward and reverse drive directions.

The cup-shaped pressing 35 of mild steel (or other magnetically permeable material) is centrally provided with an axle pin 42 extending through the bottom bight wall of the steel cup 35. The lower and upper ends of pin 42 are rotationally supported by respectively a hole or recess in the bottom of housing 34 and a hole or recess in the top closure 36. Between its ends, and above the bottom bight wall of cup-shaped pressing 35, the axle pin 42 is fast with a spur gear 44 that—via further step-down gears or gear pairs 46,47—drives the angularly rotatable output shaft 32.

It will be appreciated that, since the cup-shaped steel pressing 35 can be made very inexpensively (e.g. at approximately 30% of the cost of an equivalent, internally-toothed gear ring), the rotary-to-rotary transmission described above with reference to FIGS. 7 and 8, may have substantial commercial appeal.

Other modifications and embodiments of the invention—and applications there—of which will be readily apparent to those skilled in this art, are to be deemed within the ambit and scope of the invention, and the particular embodiment(s) hereinbefore described may be varied in construction and detail, e.g. interchanging (where appropriate or desired) different features of each, without departing from the scope of the patent monopoly hereby claimed. For example the or each axle pin 18 may be of a non-magnetic material other than brass. Additionally or alternatively, instead of using disc-like washers of steel for the pole plates 14 and 16, any other suitable magnetically permeable material may be used.

Likewise, other applications of the inventive concept may be readily devised by those skilled in this art. By way of non-limiting example, measuring or indicating instruments and/or positioning devices may be made to use drive assemblies or members such as the roller assemblies 11 to overcome the usual need for spacing between inter-meshing gear teeth that creates a measure of lost motion (backlash) and prevents truly instantaneous drive transmission between them. Furthermore, a slipping clutch effect may be readily included in a drive transmission by suitable selection of the magnetic strength of the body 15.

What is claimed is:

1. A magnetic motion transmission device comprising a magnetic body which has an outer cylindrical surface and radial end walls, is polarized axially of the cylindrical surface and, at the opposed radial ends of the cylindrical surface, has a pair of disc-like pole plates that are of like diameter greater than the diameter of the cylindrical surface and are mounted on an element of non-magnetic material extending axially through the magnetic body, characterized in that the magnetic body and pole plates are provided with an axial bore of larger diameter than said element thus providing a loose fit for said axial element to permit the body to tilt or slew to a limited degree.

2. Apparatus to effect motion transmission between first and second members, said apparatus including said members and means to provide a magnetic coupling effect between them, characterized in that said first member comprises a device according to claim 1, and in that the second member has a surface engaged by and in contact with said disc-like pole plates and is of magnetically permeable material adjacent to the engaged surface.

3. Apparatus according to claim 2 wherein the engaged surface of the said second member is of substantially planar form.

4. Apparatus according to claim 3, wherein two hollow bollards are provided which are positioned to provide a gap for a throughway between them, the bollards having vertical internal surfaces on their sides which face the said gap, said surfaces acting as the engaged surfaces of respective second members, and a barrier element extends between said two bollards and is attached at its ends to the said devices.

5. Apparatus according to claim 2 wherein the engaged surface of the said second member has a cylindrical or conical form.

6. Apparatus according to claim 5 wherein the said second member has a generally cylindrical or conical surface and is rotatable about the axis of said surface.

7. Apparatus according to claim 6, wherein said second member has a generally cylindrical surface and the latter is provided with a helical formation that is engaged by the disc-like pole pieces.

8. Apparatus according to claim 6 wherein the second member has a generally inner cylindrical engaged surface and is coupled to rotate a shaft about an axis which is parallel to the axis of said cylindrical engaged surface, which shaft provides a rotary output drive to a pivoting gate member.

9. Apparatus according to claim 6, wherein the said first member is constrained to move longitudinally of the said axis as it rotates about the said cylindrical or conical surface.

10. Apparatus according to claim 6 or claim 9, wherein a plurality of said first members is provided, these members being mounted equi-angularly about the axis of said cylindrical surface by cage means that allows them to rotate individually about their own axes.

11. Apparatus according to claim 10, wherein at least three said first members are provided.

12. Apparatus according to claim 10, wherein the surface of said second member is cylindrical, the plurality of first members is encompassed by an outer ring member having an inner surface in engagement with the disc-like pole pieces and, at least adjacent to the engagement surface, comprising a magnetically permeable material to provide the effect of a low reluctance path for the magnetic flux (in the manner of a pole shoe) between the disc-like pole plates.

13. Apparatus according to claim 12, wherein the outer ring member is constrained against rotary motion such as in use to be moved axially by the axially moving first member (s) but at a reduced rate as the (or each) first member rotates in an idling mode whilst maintaining contact of its pole pieces with both the other ring and the said second member.

* * * * *